United States Patent [19]

Weinert

[11] Patent Number: 5,385,226
[45] Date of Patent: Jan. 31, 1995

[54] APPARATUS FOR FORMING A PLURALITY OF ROWS OF ARTICLES FROM A SINGLE ROW OF ARTICLES DURING CONVEYING OF THE ARTICLES

[75] Inventor: Lawrence E. Weinert, Antioch, Calif.

[73] Assignee: James River Paper Company, Inc., Richmond, Va.

[21] Appl. No.: 285,833

[22] Filed: Aug. 3, 1994

[51] Int. Cl.⁶ .......................................... B65G 29/00
[52] U.S. Cl. ................................................. 198/441
[58] Field of Search ............... 198/436, 440, 441, 445, 198/456, 469.1, 478.1

[56] References Cited

U.S. PATENT DOCUMENTS

| | | |
|---|---|---|
| 1,236,391 | 8/1917 | Augensen . |
| 1,326,903 | 1/1920 | Augensen . |
| 2,692,713 | 10/1954 | Silva . |
| 3,139,965 | 7/1964 | Eggert . |
| 3,633,733 | 1/1972 | Rehr . |
| 3,647,044 | 3/1972 | Orstam . |
| 3,717,239 | 2/1973 | Carter ........................... 198/441 X |
| 3,967,717 | 7/1976 | Bauer ............................... 198/441 |
| 4,033,447 | 7/1977 | Heier ............................... 198/441 |
| 4,033,862 | 7/1977 | Spencer ....................... 198/435 X |
| 4,060,165 | 11/1977 | Bauer ............................... 198/442 |
| 4,176,993 | 12/1979 | Luginbühl .................. 198/441 X |
| 4,785,942 | 11/1988 | Van Leijenhorst et al. ... 198/367 X |

Primary Examiner—Cheryl L. Gastineau
Attorney, Agent, or Firm—Thomas R. Lampe

[57] ABSTRACT

Apparatus for conveying and forming a single row of articles into a plurality of rows of articles includes a starwheel receiving articles from an infeed conveyor and which is rotated by the articles. A diverter is rotated through a connection with the starwheel and receives articles from the starwheel. The diverter moves two out of three of the received articles to intermediate conveyors disposed on opposed sides of the diverter. These diverted rolls form two rows on an outfeed conveyor along with a third row of articles which were not diverted.

8 Claims, 3 Drawing Sheets

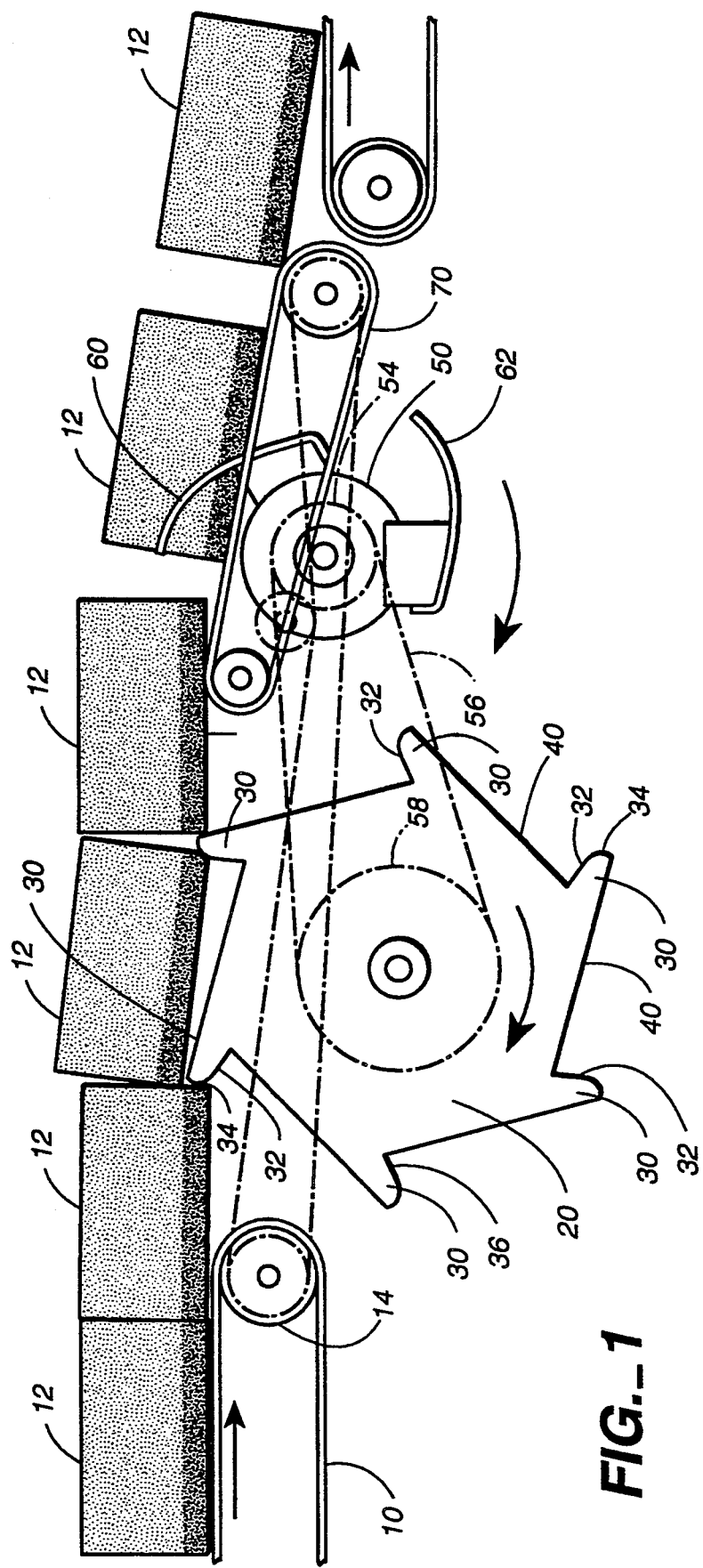
FIG._1

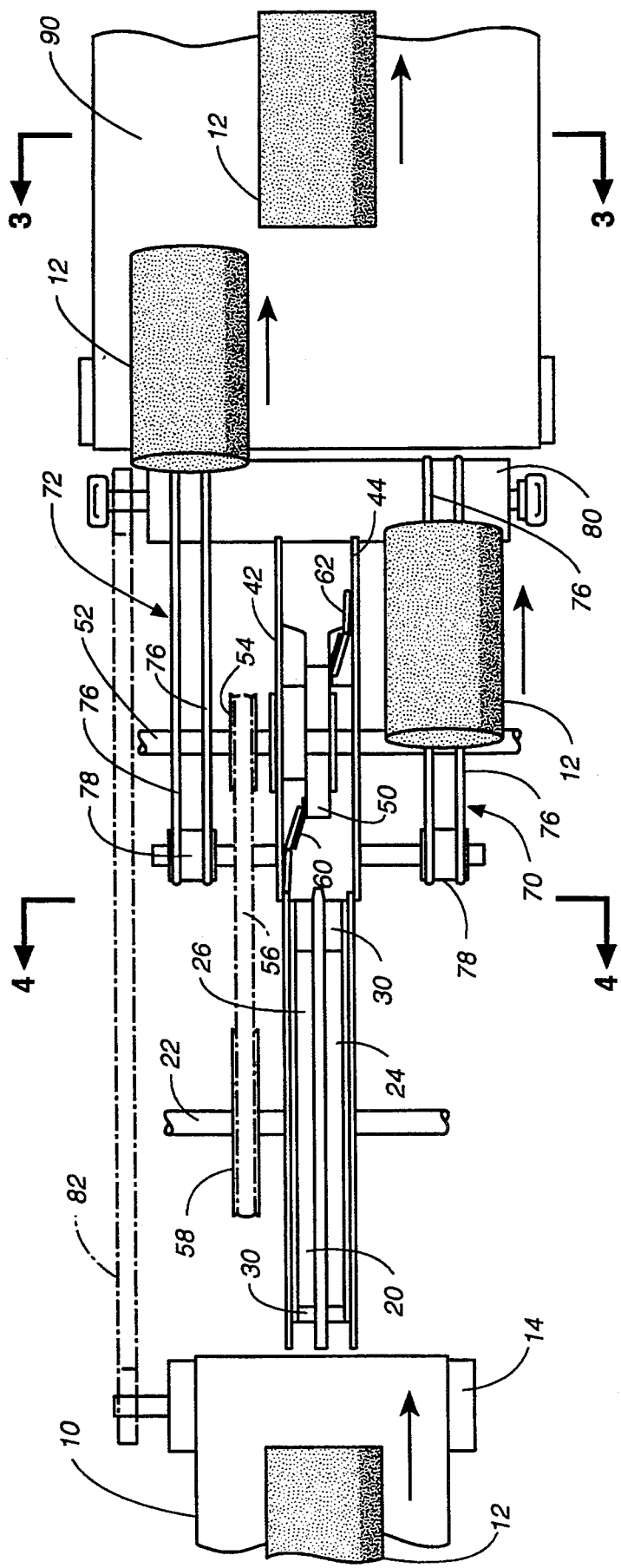
FIG._2

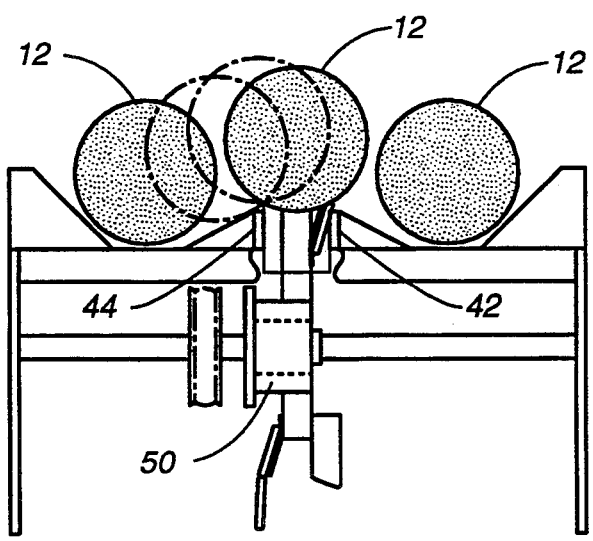
FIG._3
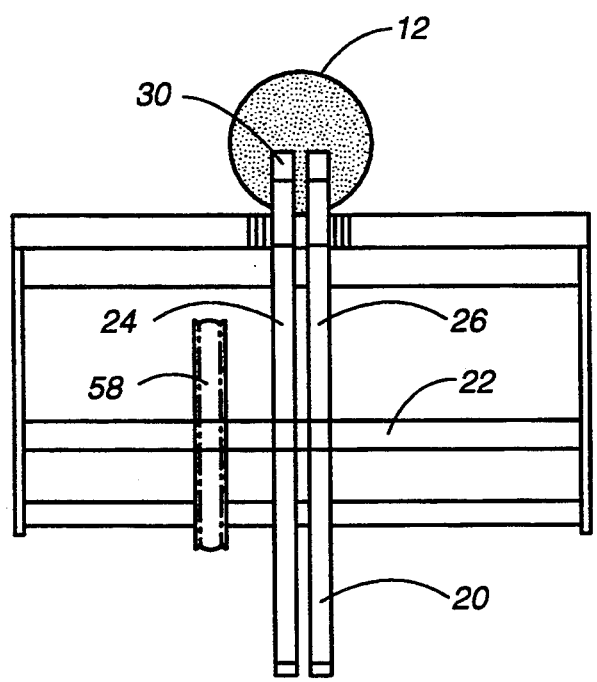
FIG._4

APPARATUS FOR FORMING A PLURALITY OF ROWS OF ARTICLES FROM A SINGLE ROW OF ARTICLES DURING CONVEYING OF THE ARTICLES

TECHNICAL FIELD

This invention relates to a conveyor system for individual articles, for example paper roll products. The invention conveys the articles and while the articles are being conveyed forms a plurality of rows of articles from a single row thereof.

BACKGROUND ART

It is well known during manufacturing operations to consolidate articles and objects of various kinds into rows and also to divert objects in a row to disassemble the row to either provide a plurality of rows of objects or to terminate the row configuration in its entirety. A number of approaches have been devised and operated in the prior art to perform these various operations depending of course on the requirements of the manufacturing system or scheme being serviced.

The present apparatus is for the purpose of conveying articles and while carrying out the conveying operation forming a plurality of rows of articles from a single row thereof. As indicated above, apparatus for accomplishing this objective generally is known in the prior art; however, such devices are often characterized by their relative complexity and considerable expense. Furthermore, a lack of reliability and uniformity of operation can occur, particularly with respect to mechanisms which are highly complex with the structural elements prone to going out of adjustment if a strict maintenance regimen is not adhered to.

The following U.S. patents were located in a search directed to this invention and the devices disclosed therein are believed to be representative of the current state of the prior art relating to the field of this invention: U.S. Pat. No. 4,785,942, issued Nov. 22, 1988, U.S. Pat. No. 4,060,165, issued Nov. 29, 1977, U.S. Pat. No. 4,033,862, issued Jul. 5, 1977, U.S. Pat. No. 3,967,717, issued Jul. 6, 1976, U.S. Pat. No. 3,647,044, issued Mar. 7, 1972, U.S. Pat. No. 3,633,733, issued Jan. 11, 1972, U.S. Pat. No. 3,139,965, issued Jul. 7, 1964, U.S. Pat. No. 2,692,713, issued Oct. 26, 1954, U.S. Pat. No. 1,326,903, issued Jan. 6, 1920, and U.S. Pat. No. 1,236,391, issued Aug. 14, 1917.

DISCLOSURE OF INVENTION

The present invention relates to apparatus which inexpensively, efficiently, and effectively provides for the conversion of a single row of conveyed articles into a plurality of rows of conveyed articles. The apparatus of the invention is characterized by its simplicity and reliability of operation.

The apparatus includes an infeed conveyor for conveying a single row of articles from a first location to a second location.

A starwheel is rotatably mounted at the second location for serial engagement by the articles in the single row of articles conveyed by the infeed conveyor. The starwheel has a plurality of starwheel projections and each article conveyed by the infeed conveyor contacts a starwheel projection and causes rotation of the starwheel under urging of the infeed conveyor.

An outfeed conveyor is spaced from the infeed conveyor.

Intermediate conveyor means is disposed between the infeed conveyor and the outfeed conveyor and includes a first intermediate conveyor and a second intermediate conveyor. The first and second intermediate conveyors are spaced from one another and each of the first and second intermediate conveyors has a discharge end adjacent to the outfeed conveyor.

Diverter means is located adjacent to the starwheel. The diverter means includes a rotatable diverter member for receiving articles from the starwheel and diverting the articles to the first intermediate conveyor and the second intermediate conveyor after the articles have disengaged from the starwheel to form a plurality of rows of the articles. The first intermediate conveyor and the second intermediate conveyor convey the plurality of rows of articles to the outfeed conveyor.

Transmission means interconnects the starwheel and the diverter means to rotate the rotatable diverter member responsive to rotation of the starwheel.

The first intermediate conveyor and the second intermediate conveyor are located on opposed sides of the rotatable diverter member. The rotatable diverter member includes spaced diverter elements for engaging articles received from the starwheel and alternately diverting the articles onto the first intermediate conveyor and the second intermediate conveyor.

The diverter elements are operable upon rotation of the rotatable diverter member to divert on to the first and second intermediate conveyors two out of three of the articles received from the starwheel. The rotatable diverter member is operable to propel one out of three of the articles received from the starwheel directly toward the outfeed conveyor without diversion whereby the articles form three rows on the outfeed conveyor.

Other features, advantages, and objects of the present invention will become apparent with reference to the following description and accompanying drawings.

BRIEF DESCRIPTION OF DRAWINGS

FIG. 1 is an elevational view of apparatus constructed in accordance with the teachings of the present invention;

FIG. 2 is a plan view of the apparatus;

FIG. 3 is a somewhat schematic view taken along the line 3—3 of FIG. 2; and

FIG. 4 is a somewhat schematic view taken along the line 4—4 of FIG. 2.

BEST MODE FOR CARRYING OUT THE INVENTION

Referring now to the drawings, a conveyor system constructed in accordance with the teachings of the present invention is illustrated. The apparatus includes an infeed conveyor 10 of standard endless-belt type utilized to convey a single row of articles 12. The articles 12 may, for example, be paper towel rolls. In any event, the articles 12 are of the same length and are conveyed lengthwise by infeed conveyor 10. Any suitable means (not shown) may be utilized to move conveyor 10. The belt of the conveyor is mounted on a rotatable roller 14 journaled relative to any suitable support structure (not shown).

Articles 12 exiting the end of infeed conveyor 10 engage a starwheel 20 which is mounted on a rotatable shaft 22. In the arrangement illustrated, starwheel 20 is comprised of two starwheel components of identical construction disposed side-by-side, such components being designated by reference numerals 24, 26; however, the starwheel could be one unitary member if desired.

Starwheel 20 has a plurality of starwheel projections 30. The articles 12, as previously indicated, are of a uniform length and the distal ends of adjacent starwheel projections 30 are spaced apart a distance substantially corresponding to the length of the articles.

Each of the starwheel projections includes an abutment surface 32 engageable by an end of an article received from the infeed conveyor 10. Abutment surfaces 32 are, as illustrated in FIG. 1, curved at the distal ends of the starwheel projections. The curved portion 34 leads inwardly to a flat abutment surface portion 36. An elongated straight surface 40 extends between adjacent projections.

As rolls 12 are conveyed off the end of the infeed conveyor 10, each roll end will engage a projection 30 and cause rotation of the starwheel in the direction of the arrow shown in FIG. 1. Rotation of the starwheel under the urging of the conveyor 10 will result in serial passage of the articles 12 over the starwheel and into contact with the upper edges of support walls 42, 44, the support walls being spaced apart a distance less than the width of the articles.

Disposed between support walls 42, 44 is diverter means including a rotatable diverter member 50 fixedly mounted on a rotatable shaft 52. A sprocket 54 is affixed to shaft 52 and is interconnected by a chain 56 to a sprocket 58 affixed to shaft 22. Rotation of starwheel 20 will thus cause rotation of rotatable diverter member 50 in timed relationship therewith.

Diverter member 50 includes diverter elements 60, 62 which are depicted in the form of wires or bars which are bent. The diverter elements are operable to divert articles 12 alternately to the right and left as they proceed along and on support walls 42, 44. It is to be noted that the diverter elements 60, 62 are located so that they engage two out of three articles passing by. That is, the diverter elements 60, 62 define a gap over a third of the circumference of the rotatable diverter member generally corresponding in length to an article 12. Thus, one out of three articles will not be diverted and will slide downwardly along the inclined sections of support walls 42, 44.

Intermediate conveyors 70, 72 are located on opposed sides of the rotatable diverter member 50. Each intermediate conveyor is in the form of two spaced belts 76 looped about freely rotatable sheaves 78 and also about a rotatable roller 80. Roller 80 is connected by a transmission chain or belt 82 to roller 14 of infeed conveyor 10. Thus, rotation of infeed conveyor roller 14 will result in rotation of both roller 80 and sheaves 78 to move the upper runs of the belts 76 to the right as viewed in FIGS. 1 and 2.

The diverter elements 60, 62 will, out of a group of three articles, divert one of the articles on to intermediate conveyor 70, and another of the articles on to intermediate conveyor 72. As previously stated, the third article will not be engaged by the diverter elements and will slide downwardly on support walls 42, 44. A pusher element (not shown) may be affixed to member 50 to facilitate this action.

This will result in delivery of three rows of articles 12 onto an outfeed conveyor 90 of any suitable type. Thus, three rows of articles, in this case paper towel rolls, will be delivered to a desired location.

I claim:

1. Apparatus comprising, in combination:
   an infeed conveyer for conveying a single row of articles from a first location to a second location;
   a starwheel rotatably mounted at said second location for serial engagement by the articles in the single row of articles conveyed by said infeed conveyor, said starwheel having a plurality of starwheel projections and each article conveyed by said infeed conveyor contacting a starwheel projection and causing rotation of said starwheel under urging of said infeed conveyor;
   an outfeed conveyor spaced from said infeed conveyor;
   intermediate conveyor means disposed between said infeed conveyor and said outfeed conveyor and including a first intermediate conveyor and a second intermediate conveyor, said first and second intermediate conveyors being spaced from one another and each of the first and second intermediate conveyors having a discharge end adjacent to said outfeed conveyor;
   diverter means located adjacent to said starwheel including a rotatable diverter member for receiving articles from said starwheel and diverting said articles to said first intermediate conveyor and said second intermediate conveyor after said articles have disengaged from said starwheel to form a plurality of rows of said articles, said first intermediate conveyor and said second intermediate conveyor conveying said plurality of rows of articles to said outfeed conveyor; and
   transmission means interconnecting said starwheel and said diverter means to rotate said rotatable diverter member responsive to rotation of said starwheel.

2. The apparatus according to claim 1 wherein said first intermediate conveyor and said second intermediate conveyor are located on opposed sides of said rotatable diverter member, said rotatable diverter member including spaced diverter elements for engaging articles received from said starwheel and alternately diverting the articles on to said first intermediate conveyor and on to said second intermediate conveyor.

3. The apparatus according to claim 2 wherein said diverter elements are operable upon rotation of said rotatable diverter member to divert on to said first and second intermediate conveyors two out of three of the articles received from said starwheel, one out of three of the articles received from the starwheel directly moving toward said outfeed conveyor without diversion whereby said articles form three rows on said outfeed conveyor.

4. The apparatus according to claim 1 wherein said articles have a uniform length and are conveyed lengthwise by said infeed conveyor, each of said plurality of starwheel projections having a distal end, and the distal ends of adjacent starwheel projections being spaced apart a distance substantially corresponding to the uniform length of said articles.

5. The apparatus according to claim 4 wherein each of said starwheel projections includes an abutment surface engageable by the end of an article received from the infeed conveyor.

6. The apparatus according to claim 5 wherein the abutment surfaces are curved at the distal ends of said starwheel projections.

7. The apparatus according to claim 1 herein said first and second intermediate conveyors are endless belt conveyors.

8. The apparatus according to claim 1 wherein said transmission means comprises at least one endless transmission belt extending between said starwheel and said diverter means, said transmission belt rotating said rotatable diverter member in synchronized relationship with said starwheel.

* * * * *